US012583347B2

(12) United States Patent
Do et al.

(10) Patent No.: US 12,583,347 B2
(45) Date of Patent: Mar. 24, 2026

(54) VEHICLE CHARGING ROBOT DEVICE

(71) Applicant: KOREA INSTITUTE OF MACHINERY & MATERIALS, Daejeon (KR)

(72) Inventors: Hyunmin Do, Daejeon (KR); Hwisu Kim, Daejeon (KR); Jongwoo Park, Sejong-si (KR); Byoungkil Han, Daejeon (KR); Hyunuk Seo, Seoul (KR); Doohyeong Kim, Sejong-si (KR); Chanhun Park, Daejeon (KR); Dongil Park, Daejeon (KR); Taeyong Choi, Daejeon (KR); Uikyum Kim, Daejeon (KR); Jinho Kyung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 628 days.

(21) Appl. No.: 18/015,014

(22) PCT Filed: Jul. 9, 2021

(86) PCT No.: PCT/KR2021/008810
§ 371 (c)(1),
(2) Date: Jan. 6, 2023

(87) PCT Pub. No.: WO2022/010315
PCT Pub. Date: Jan. 13, 2022

(65) Prior Publication Data
US 2023/0256846 A1 Aug. 17, 2023

(30) Foreign Application Priority Data

Jul. 9, 2020 (KR) ........................ 10-2020-0084886

(51) Int. Cl.
B60L 53/35 (2019.01)
B25J 5/02 (2006.01)
(Continued)

(52) U.S. Cl.
CPC ................. B60L 53/35 (2019.02); B25J 5/02 (2013.01); B25J 9/0018 (2013.01); B25J 11/008 (2013.01);
(Continued)

(58) Field of Classification Search
CPC ....................................................... B60L 53/35
(Continued)

(56) References Cited

U.S. PATENT DOCUMENTS 5,498,948 A * 3/1996 Bruni .................... B60L 53/126
320/108
5,646,500 A * 7/1997 Wilson .................. B60L 53/126
439/246
(Continued)

FOREIGN PATENT DOCUMENTS

JP         H8-19978 A      1/1996
JP         2000-108058 A   4/2000
(Continued)

OTHER PUBLICATIONS

International Search Report dated Oct. 20, 2021 for corresponding International Patent Application No. PCT/KR2021/008810, 4 pages.
(Continued)

*Primary Examiner* — Jerry D Robbins
(74) *Attorney, Agent, or Firm* — Hauptman Ham, LLP

(57) ABSTRACT

The objective of the present invention is to provide a vehicle charging robot device, of which a robot for charging a vehicle is stored in a case, so as to protect the robot from
(Continued)

external conditions including rain, wind, temperature, humidity, and the like, and prevent malfunction or failure, or damage to the robot.

18 Claims, 9 Drawing Sheets

(51) Int. Cl.

| | |
|---|---|
| B25J 9/00 | (2006.01) |
| B25J 11/00 | (2006.01) |
| B25J 19/02 | (2006.01) |
| B60L 53/60 | (2019.01) |
| B67D 7/04 | (2010.01) |

(52) U.S. Cl.
CPC .............. *B25J 19/02* (2013.01); *B60L 53/60* (2019.02); *B67D 7/0401* (2013.01); *B67D 2007/0403* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 5,703,461 | A * | 12/1997 | Minoshima | B60L 53/126 |
| | | | | 320/108 |
| 5,821,731 | A * | 10/1998 | Kuki | B60L 53/14 |
| | | | | 320/108 |
| 6,157,162 | A * | 12/2000 | Hayashi | H02J 7/0042 |
| | | | | 320/104 |
| 7,999,506 | B1 * | 8/2011 | Hollar | B60L 53/34 |
| | | | | 320/109 |
| 9,902,271 | B2 * | 2/2018 | Ichikawa | H02J 50/12 |
| 10,071,644 | B2 * | 9/2018 | Wechsler | H02J 7/0044 |
| 10,336,204 | B2 * | 7/2019 | Chabaan | H02J 50/12 |
| 10,543,753 | B2 * | 1/2020 | Wechsler | H02J 50/90 |
| 10,604,021 | B2 * | 3/2020 | Brown | B60L 53/124 |
| 10,744,881 | B2 * | 8/2020 | Gamsjäger | B60L 53/14 |
| 12,139,030 | B1 * | 11/2024 | Booth | B60L 53/36 |
| 2012/0140224 | A1 * | 6/2012 | Switkes | G01N 21/78 |
| | | | | 356/369 |
| 2013/0037339 | A1 * | 2/2013 | Hickox | G01S 17/46 |
| | | | | 33/264 |
| 2014/0035565 | A1 * | 2/2014 | Enthaler | G01B 7/14 |
| | | | | 324/207.17 |
| 2014/0067660 | A1 * | 3/2014 | Cornish | B60L 53/35 |
| | | | | 705/39 |
| 2014/0092236 | A1 * | 4/2014 | Findeisen | B60L 53/16 |
| | | | | 348/118 |
| 2015/0061576 | A1 * | 3/2015 | Chen | B60L 53/31 |
| | | | | 320/108 |
| 2015/0137744 | A1 * | 5/2015 | Lee | B60L 53/37 |
| | | | | 320/108 |
| 2015/0139761 | A1 * | 5/2015 | Qi | E04H 6/42 |
| | | | | 414/253 |
| 2015/0210174 | A1 * | 7/2015 | Settele | B60L 53/35 |
| | | | | 320/109 |
| 2016/0023556 | A1 * | 1/2016 | Bell | B60L 53/126 |
| | | | | 320/108 |

| | | | | |
|---|---|---|---|---|
| 2016/0046198 | A1 * | 2/2016 | Krammer | B60L 53/37 |
| | | | | 701/22 |
| 2016/0114687 | A1 * | 4/2016 | Ichikawa | B60L 53/38 |
| | | | | 307/104 |
| 2017/0001527 | A1 * | 1/2017 | Prokhorov | B60L 53/126 |
| 2017/0008412 | A1 * | 1/2017 | Wu | B60L 53/65 |
| 2017/0106763 | A1 * | 4/2017 | Dow | B60L 53/37 |
| 2017/0136881 | A1 * | 5/2017 | Ricci | B60L 5/24 |
| 2017/0136885 | A1 * | 5/2017 | Ricci | B60L 53/126 |
| 2017/0136891 | A1 * | 5/2017 | Ricci | B60L 53/64 |
| 2017/0136892 | A1 * | 5/2017 | Ricci | H02J 50/10 |
| 2017/0136903 | A1 * | 5/2017 | Ricci | B64D 39/00 |
| 2017/0182903 | A1 * | 6/2017 | Kwasnick | B60L 53/122 |
| 2017/0225583 | A1 * | 8/2017 | Chai | B60L 53/37 |
| 2017/0274787 | A1 * | 9/2017 | Salter | B60L 53/124 |
| 2017/0291496 | A1 * | 10/2017 | Gerfast | B60L 53/16 |
| 2018/0105048 | A1 * | 4/2018 | Hsu | H04B 5/79 |
| 2018/0290550 | A1 * | 10/2018 | Yang | H02J 50/10 |
| 2019/0001832 | A1 * | 1/2019 | Schütz | B60L 53/37 |
| 2019/0329667 | A1 * | 10/2019 | Strasser | G06V 20/56 |
| 2020/0009978 | A1 * | 1/2020 | Shin | H02J 7/0045 |
| 2020/0016760 | A1 * | 1/2020 | Lee | B25J 9/1697 |
| 2020/0031248 | A1 * | 1/2020 | Kwak | G05D 1/0231 |
| 2020/0055417 | A1 * | 2/2020 | Pachler | B60M 7/003 |
| 2020/0070681 | A1 * | 3/2020 | Niwa | H02J 50/12 |
| 2020/0164758 | A1 * | 5/2020 | Flechl | B60L 53/16 |
| 2020/0353833 | A1 * | 11/2020 | Kim | H02J 7/0045 |
| 2020/0361331 | A1 * | 11/2020 | Shin | H02J 7/0045 |
| 2021/0001736 | A1 * | 1/2021 | Schoob | B60L 53/37 |
| 2021/0008991 | A1 * | 1/2021 | Schütz | B25J 15/0004 |
| 2021/0086601 | A1 * | 3/2021 | Choi | B60K 1/04 |
| 2021/0086639 | A1 * | 3/2021 | Rakuff | B60L 53/31 |
| 2021/0086643 | A1 * | 3/2021 | Satheesh Babu | B60L 53/14 |
| 2021/0094431 | A1 * | 4/2021 | Yang | H02J 7/0045 |
| 2021/0101496 | A1 * | 4/2021 | Brendel | B60L 53/37 |
| 2021/0178922 | A1 * | 6/2021 | Cole | B60L 53/37 |
| 2021/0237596 | A1 * | 8/2021 | Butina | B60L 53/66 |
| 2021/0237716 | A1 * | 8/2021 | Prasad | H04N 23/90 |
| 2021/0261011 | A1 * | 8/2021 | Schaller | B60L 53/38 |
| 2021/0284036 | A1 * | 9/2021 | Daminelli | B60L 53/30 |
| 2021/0331597 | A1 * | 10/2021 | Kamon | B25J 19/023 |
| 2022/0001761 | A1 * | 1/2022 | Cole | G06V 10/143 |
| 2022/0055495 | A1 * | 2/2022 | Labell | B60L 53/37 |
| 2022/0097544 | A1 * | 3/2022 | Tanaami | B60L 53/16 |
| 2022/0153157 | A1 * | 5/2022 | Nam | B60L 53/37 |
| 2022/0219557 | A1 * | 7/2022 | Poluboiarinov | H02J 7/0049 |
| 2022/0289050 | A1 * | 9/2022 | Neff | B60L 53/16 |
| 2022/0348097 | A1 * | 11/2022 | Garofalo | B60L 53/36 |
| 2022/0375281 | A1 * | 11/2022 | Huang | G07C 5/0816 |
| 2024/0140233 | A1 * | 5/2024 | Kromrey | B60L 53/16 |
| 2024/0246439 | A1 * | 7/2024 | Matsui | B65H 75/446 |
| 2024/0294081 | A1 * | 9/2024 | Zimmerman | B60L 53/66 |
| 2025/0001886 | A1 * | 1/2025 | Sato | B60L 53/37 |

FOREIGN PATENT DOCUMENTS

| | | |
|---|---|---|
| JP | 2019-165544 A | 9/2019 |
| KR | 10-2019-0040441 A | 4/2019 |
| KR | 10-2019-0100893 A | 8/2019 |

OTHER PUBLICATIONS

Written Opinion dated Oct. 20, 2021 for corresponding International Patent Application No. PCT/KR2021/008810, 4 pages.

* cited by examiner

- Prior Art –

VEHICLE CHARGING ROBOT DEVICE

CROSS-REFERENCE TO RELATED APPLICATION

The present application is a national stage filing under 35 U.S.C § 371 of PCT application number PCT/KR2021/008810 filed on Jul. 9, 2021 which is based on and claims priority to Korean Patent Application No. 10-2020-0084886 filed on Jul. 9, 2020 in the Korean Intellectual Property Office, which are incorporated herein by reference in their entireties.

TECHNICAL FIELD

The present invention relates to a robot, and more particularly, to a vehicle charging robot device capable of charging a vehicle with electricity or fossil fuel.

BACKGROUND ART

In general, the types of commercialized vehicles are internal combustion engine vehicles and electric vehicles. Internal combustion engine vehicles can be refueled at gas stations depending on driving fuel, and electric vehicles can be charged at electric vehicle charging stations. In order to charge fuel of an internal combustion engine vehicle or electricity of an electric vehicle, it is necessary to connect a charger to a charging inlet formed in the vehicle, and it takes a certain amount of time for charging.

Conventionally, when refueling a vehicle at a gas station or charging electricity, an automatic refueling device that connects a charger to a charging inlet instead of a gas station employee, vehicle driver, or passenger has been used, and the embodiments are as follows. Referring to Korean Patent Application Laid-Open No. 10-2019-0040441, as illustrated in FIG. 1, a conventional gas pump with an automatic refueling device has an arm formed with a joint operated by a sensor and a motor to hold a nozzle of the gas pump, and refueling is possible automatically by inserting the nozzle of the gas pump into a filling inlet of the vehicle.

However, in the conventional automatic refueling device, the arm formed in the gas pump can perform refueling work for only one vehicle, so in order to refuel a plurality of vehicles, a plurality of gas pumps and an automatic refueling device for each gas pump are required. Also, there was a disadvantage in that the automatic refueling device made of electronic components such as motors and sensors was exposed to the risk of malfunction and failure by an external environment including snow, rain, wind, temperature, humidity, etc.

DISCLOSURE

Technical Problem

The present invention has been devised to solve the above problems, and aims to provide a vehicle charging robot device capable of protecting a robot for vehicle charging from an external environment including rain, wind, temperature, humidity and the like, and preventing the robot device from malfunction, failure, and damage, by storing a robot for vehicle charging in a case.

Technical Solution

One embodiment is a robot device for charging a vehicle using a charger fixed on the ground and having a charging gun connected to a vehicle for charging fuel or electricity, including: a body part comprising a ceiling portion and a pillar portion, the pillar portion being fixedly formed on the same ground as the charger; a robot having one side connected to the ceiling portion and movable within a radius of the ceiling portion, and another side holding the charging gun; a case formed in the body part, having one surface thereof openable and closable, and storing the robot therein; and a central control unit capable of communicating with an outside, formed in the body part, and controlling the body part, the robot, and the case.

The case may store the robot therein when there is no entry or exit of the vehicle or in a standby state where charging of the vehicle is unnecessary.

The case is formed in the ceiling portion, and the one surface thereof is openable and closable to discharge the robot downwardly from the ceiling portion.

The case may be formed in the ceiling portion.

The case may further include a temperature regulating device for heating or cooling an inside of the case.

The temperature regulating device may include one or more among a heater, an air-conditioner, a blower fan, or a heating wire.

The case may include: a second temperature sensor formed on an outside of the case; and a third temperature sensor formed inside the case, and the central control unit may control the temperature regulating device using one or more values measured by the second temperature sensor or the third temperature sensor.

The case may include: a first humidity sensor formed on an outside of the case; and a second humidity sensor formed on an inside of the case, and the central control unit may control the temperature regulating device using one or more values measured by the first humidity sensor or the second humidity sensor.

The case may further include a brush part formed inside the case and cleaning a foreign substance on a surface of the robot.

The case may further include an air gun formed inside the case and spraying air onto the surface of the robot.

The ceiling portion may be formed in a certain length or a certain area along an extension direction of the ceiling portion, and further include a rail on which the robot or the case moves.

The rail may include a linear motor, a ball screw, a lead screw and a rack-and-pinion.

Two or more rails may be installed thereon, and the robot may be installed on each of the rails.

The number of rails may be less than the total number of vehicles which are chargeable.

The ceiling portion may rotate with respect to the pillar portion, and one side of the robot is connected to the ceiling portion and a position of the robot is changed according to rotation of the ceiling portion.

The robot device may include: a body part connecting portion formed at one end and connected to the body part; a grip part formed at another end to hold the charging gun; a plurality of length parts connecting the body part connecting portion and the grip part; and a link part formed between the plurality of length parts to connect the length parts to each other, and including a motor and a speed reducer.

The robot device may further include: a first temperature sensor formed in the link part, and the central control unit heats the motor, when a temperature measured by the first temperature sensor is less than a predetermined reference temperature.

The link part may further include: a discharge hole for discharging water droplets inside the link part to an outside due to condensation.

Advantageous Effect

The vehicle charging robot device according to the present disclosure according to the configuration as described above is effective in preventing deterioration of the operational effectiveness of the robot due to external environments such as snow, rain, wind, temperature, condensation and solar radiation and the like, occurrence of malfunction or failure, and physical damage, by storing the robot in a case when the robot is in a standby state.

MODE FOR INVENTION

Hereinafter, the technical idea of the present disclosure will be described in more detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the embodiments proposed herein and configurations illustrated in the accompanying drawings are just preferable examples only for the purpose of illustrations, not representative of the entire technical ideas of the present disclosure, so it should be understood that other equivalents and modifications could be made thereto without departing from the spirit and scope of the invention.

Hereinafter, the technical idea of the present disclosure will be described in more detail with reference to the accompanying drawings. The accompanying drawings are merely examples to explain the technical idea of the present disclosure in more detail, thus the technical idea of the present disclosure is not limited in the forms of accompanying drawings.

Figure 1:
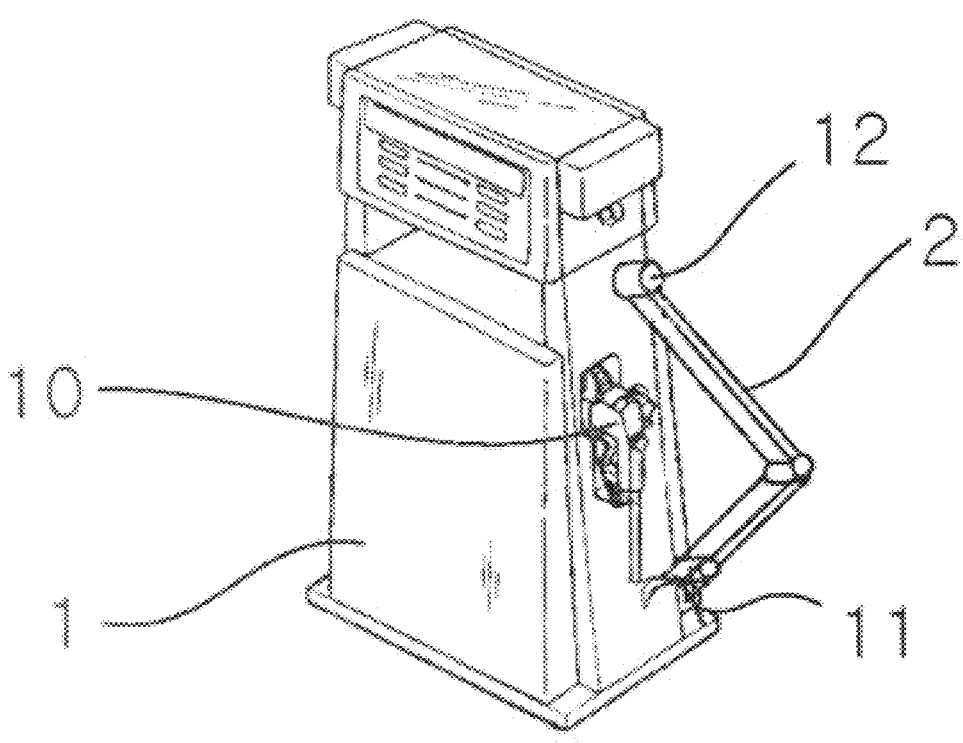
FIG. 1 is a conventional gas pump with an automatic refueling device.
Figure 2:
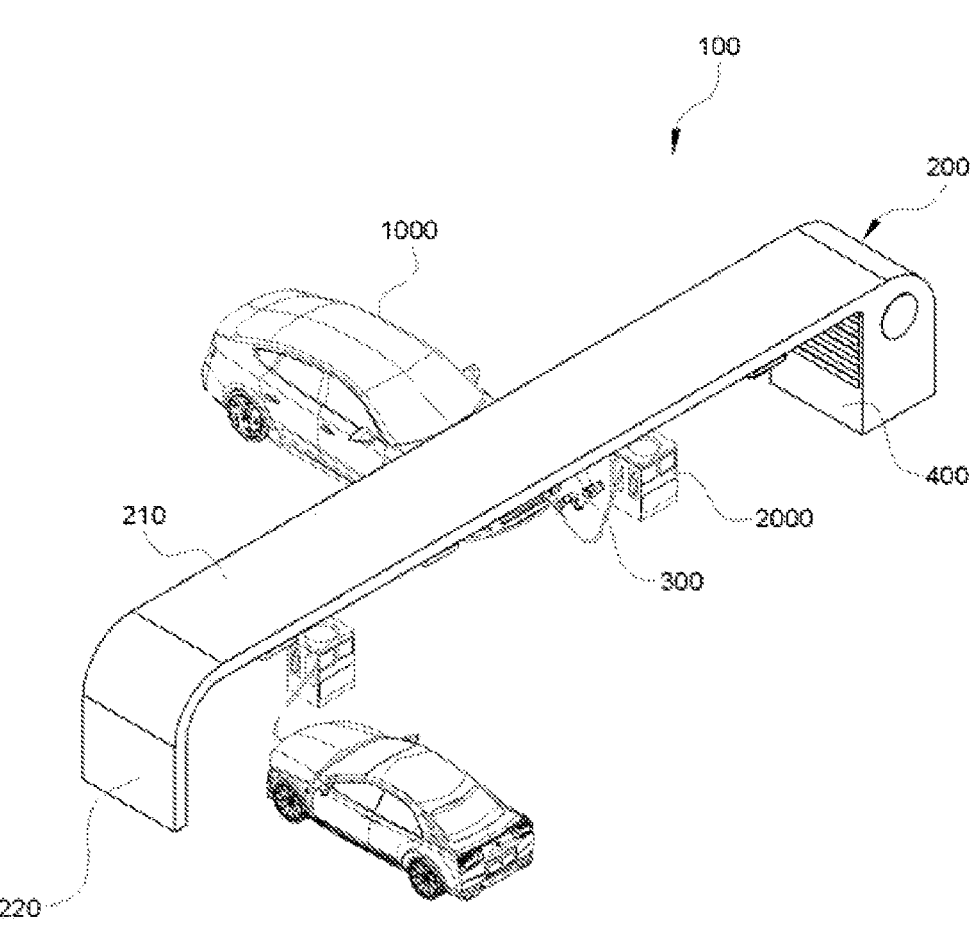
FIG. 2 is a perspective view of a first embodiment of the vehicle charging robot device according to the present disclosure.
Figure 3:
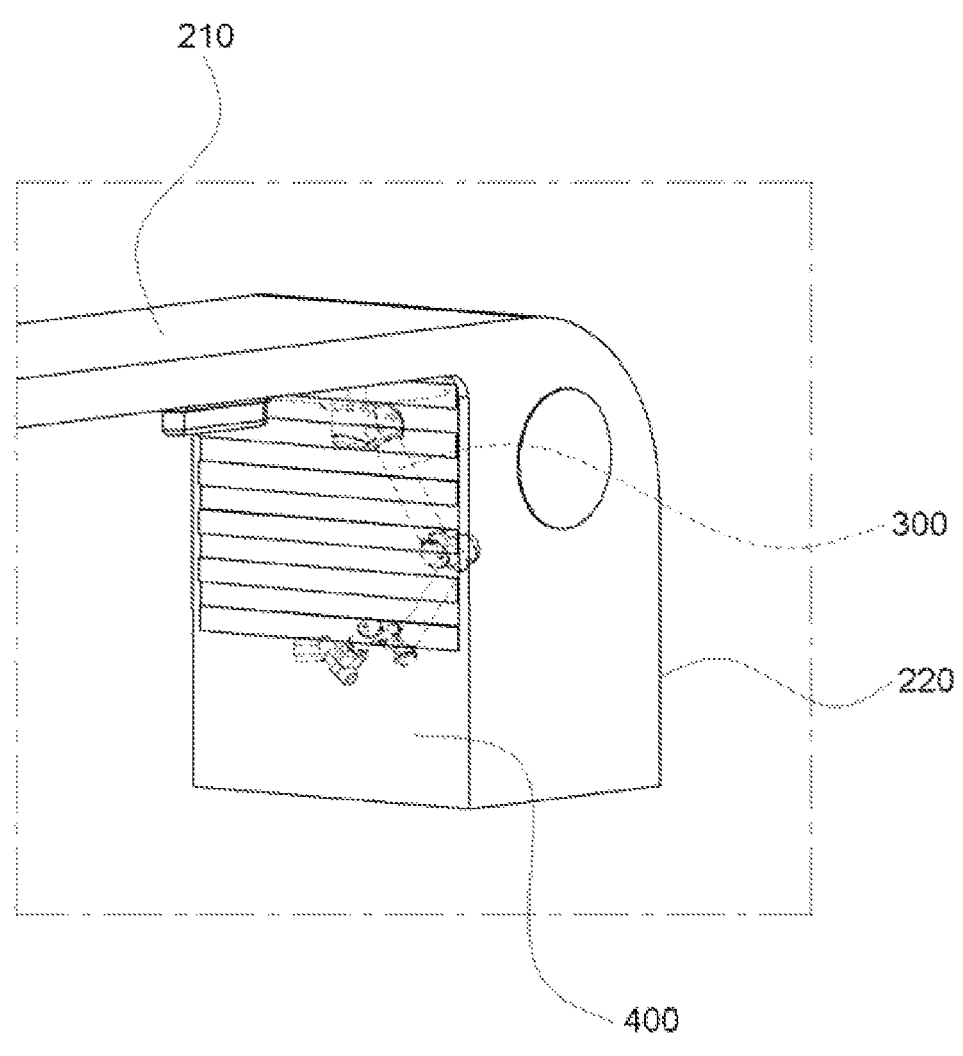
FIG. 3 is an enlarged view of the case of the vehicle charging robot device according to the present disclosure.

Referring to FIGS. 2 to 3, a robot device 100 for charging a vehicle according to the present disclosure is a robot 300 for charging a vehicle 1000 using a charger 2000 fixed on the ground and having a charging gun 2100 connected to a vehicle 1000 for charging fuel or electricity, including: a body part 200 including a ceiling portion 210 and a pillar portion 220, with the pillar portion 220 fixedly formed on the same ground as the charger 2000; a robot 300 having one side connected to the body part 200 and movable within the body part 200, and another side holding the charging gun 2100; a case 400 formed in the pillar portion 220, having one surface thereof openable and closable, and storing the robot therein; and a central control unit 500 capable of communicating with an outside, formed in the body part 200, and controlling the body part 200, the robot 300, and the case 400.

The charger 2000 may be configured as a gas pump for injecting fossil fuel into the vehicle 1000 or an electric charger 2000 for applying electric energy. It is preferable that a plurality of one type of the charger 2000 selected among the electric charger 2000 or the gas pump to be formed, and the type of the vehicle 1000 that can be charged may vary depending on the type of the charger 2000. The charging gun 2100 may have one end connected to the charger 2000 and another end to the vehicle 1000 to deliver fossil fuel or electric energy stored in the charger 2000 to the vehicle 1000.

The body part 200 includes the pillar portion 220 formed on the ground where the charger 2000 is formed, and the ceiling portion 210 connected to the pillar portion 220 and covering the ground. In addition, the case 400 in which the robot 300 is stored is formed in the body part 200, and the case 400 may be formed in the pillar portion 220, or in the ceiling portion 210. For example, the case 400 may be formed on the pillar portion 220, and in this case, it is possible to facilitate easier maintenance of the robot 300 stored in the pillar portion 220. For example, when the case 400 is formed at a position close to the ground among the pillar portion 220, it may be easy to repair a malfunction of the robot 300. In addition, a temperature regulating device, a humidity regulating device and the like are additionally provided inside the case 400, which will be described later, and it may be easier to manage the retainer device using such devices.

One side of the robot 300 is connected to one among the ceiling portion 210 or the pillar portion 220, and another side thereof is controlled to hold or release the charging gun 2100 formed in the charger 2000. At this time, movement and operation of the robot 300 is made inside a radius of the ceiling portion 210, and it is preferable to protect the robot 300 as much as possible from climate phenomena such as snow or rain.

The case 400 is a configuration to store the robot 300 therein, and when the robot 300 is in a standby state in which there is no entry or exit of the vehicle 1000 or charging of the vehicle 1000 is not required, the robot 300 may be maintained in the standby state in the case 400. In addition, even when the robot 300 moves to charge the vehicle 1000, the case 400 moves together with the robot 300 in a state where the robot 300 is stored therein, and the robot 300 may be kept in the standby state in the case 400. In addition, the open side of the case 400 may be opened and closed by an opening and closing means such as a shutter, and the opening and closing means are opened when the robot 300 enters and exits.

For example, the case 400 may be formed in the pillar portion 220. In particular, when the case 400 is formed at a position close to the ground in the pillar portion 220, it may be easy to repair a malfunction of the robot 300. In addition, the temperature regulating device, the humidity regulating device and the like, which will be described later, are additionally provided inside the case 400 and it may be easier to manage the retainer device through the devices.

For another example, the case 400 may be formed in the ceiling portion 210. In this case, a door of the case 400 is configured to open and close downward, and the robot may be discharged downward. In addition, a rail 211 as described below may be positioned inside the case 400. In addition, the temperature regulating device, the humidity regulating device and the like, which will be described later, may be additionally provided inside the case 400.

For example, the robot 300 may be discharged from the case 400. The discharged robot 300 may move to a fueling port or a charging inlet of the vehicle to start refueling or charging the vehicle.

The central control unit 500 is configured to control the body part 200, the robot 300, and the case 400, and may receive an entry signal of the vehicle 1000 from the outside.

The vehicle charging robot device 100 according to the present disclosure through the above configuration has an advantage of preventing the robot 300 from degradation of the operational effectiveness, malfunction or failure due to external environments such as snow, rain, wind, temperature and condensation, solar radiation and the like, and physical damage, by storing the robot 300 in the case 400 when the robot 300 is in the standby state.

Figure 4:
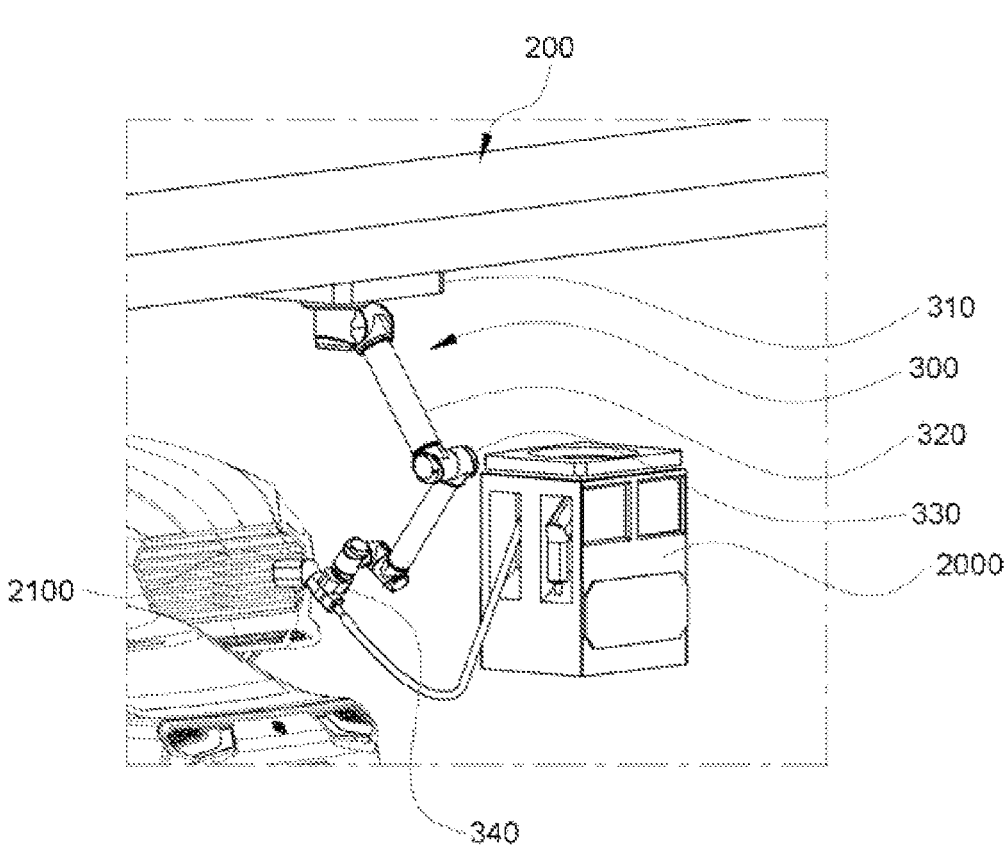
FIG. 4 is an enlarged view of the robot of the vehicle charging robot device according to the present disclosure.
Figure 5:
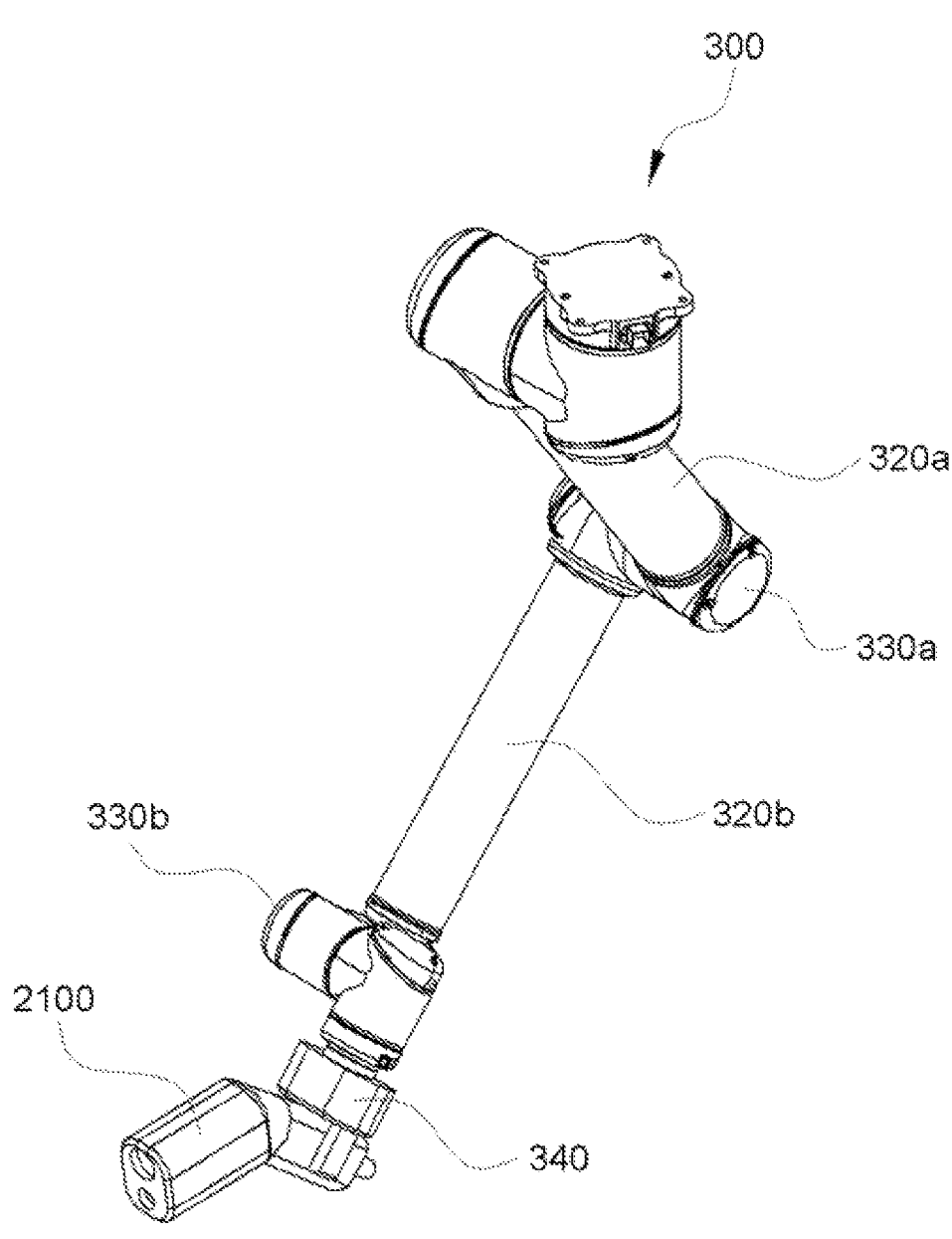
FIG. 5 is a perspective view of the robot of the vehicle charging robot device according to the present disclosure.

Referring to FIGS. 4 and 5, the robot device 300, includes: a body part connecting portion 310 formed at one end and connected to the body part 200; a grip part 340 formed at another end to hold the charging gun 2100; a plurality of length parts 320, 320a and 320b connecting the body part connecting portion 310 and the grip part 340; and link parts 330, 330a and 330b formed between the plurality of length parts 320, 320a and 320b to connect the length parts to each other, and including a motor 331 and a speed reducer 332.

The robot 300 may be connected to the body part 200 through the body part connecting portion 310, and it is preferable that the connection between the body part 200 and the body part connecting portion 310 to be made such that the body part connecting portion 310 is connected to be movable within the forming range of the body part 200 and the case 400.

The grip part 340 is configured to hold the charging gun 2100 formed in the charger 2000, and the grip part 340 is formed as a pair of grips, and a distance between the pair is adjustable to hold or release the charging gun 2100. A camera or a laser sensor may be installed in the grip part 340, and as the central control unit 500 controls the robot 300 according to image information of the camera or sensing information of the laser sensor, the charging gun 2100 may be connected to a charging inlet formed in the vehicle 1000. For example, a type of a vehicle may be recognized using a camera formed in the grip part 340. Since a position of the charging inlet may vary depending on a manufacturer of the vehicle or a model name of the vehicle, a position at which the robot 300 should be moved to start charging among positions in the vehicle may be determined by recognizing a type of the vehicle using the camera formed in the grip part 340.

The robot 300 may be formed of a plurality of length parts 320, 320a and 320b and a plurality of link parts 330, 330a and 330b connecting the length parts 320, 320a and 320b to each other. The central control unit 500 controls the motor 331 and the speed reducer formed in the link parts 330, 330a and 330b, and adjusts angles of the length parts 320, 320a and 320b, thereby controlling operation of the robot 300. The central control unit 500 maintains the robot 300 in a predetermined standby posture when storing the robot in the standby state in the case 400, and when the robot 300 returns to the inside of the case 400, by controlling the plurality of link parts 330, 330a and 330b, instantaneous vibration is generated in the entire robot 300, or the length parts 320, 320a and 320b of the robot 300 are shaken as if a person shakes own hands, thus foreign substances, dust, rain or snow attached to the robot 300 may be dusted off from the robot 300. The dust-off control as described above may proceed even when the robot 300 is outside the case 400.

The robot 300 further includes a first temperature sensor 333 formed in the link parts 330, 330a and 330b, and the central control unit 500 controls to heat the motor, when a temperature measured by the first temperature sensor is less than a predetermined reference temperature. That is, the central control unit 500 may designate a reference temperature of the temperature of the link parts 330, 330a and 330b that is a temperature at which the motor 331 and the speed reducer 332 are difficult to become operable due to the driving torque, and when the temperature measured by the first temperature sensor 333 falls below the reference temperature, the motor 331 is controlled to generate heat without rotational motion, thereby an operation error of the motor 331 and the reducer 332 can be prevented.

Figure 6:
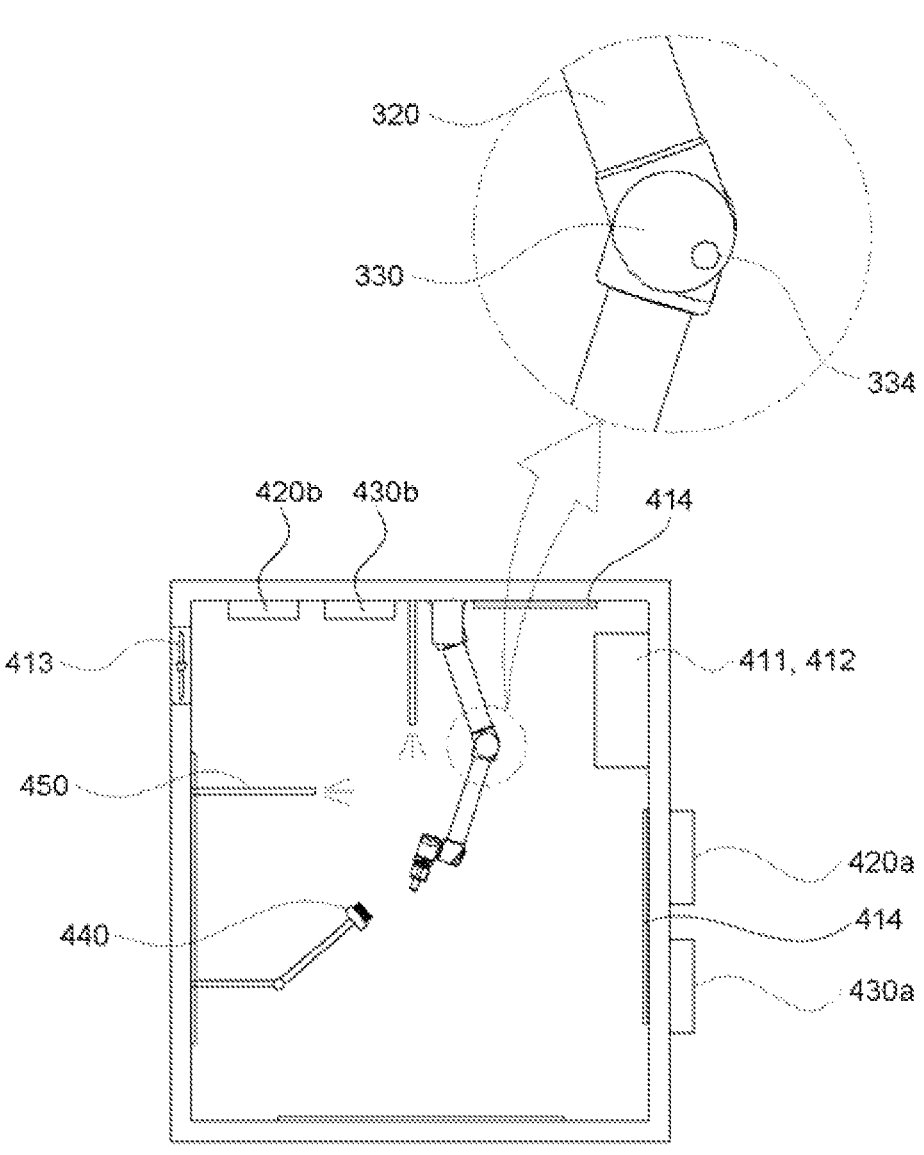
FIG. 6 is a cross-sectional view of the case of the vehicle charging robot device according to the present disclosure.

Referring to FIG. 6, the link part 330, 330a and 330b further includes a discharge hole 334 for discharging water droplets inside the link parts 330, 330a and 330b to an outside due to condensation. The discharge hole 334 is configured to discharge water droplets generated due to condensation inside the robot 300 to the outside, and the discharge hole 334 is closed from the outside of the case 400 to prevent dust, foreign substances, snow, rain, insects and the like from entering into the discharge hole 334, and an inside of the case 400 is opened for a certain period of time so that water droplets generated inside the robot 300 can be discharged to the outside. The discharge hole 334 may be formed in each of the plurality of link parts 330, 330a and 330b, and the discharge hole 334 is formed on the link part 330, 330a and 330b, and the discharge holes 334 are preferably formed at positions corresponding to a direction in which the water droplets inside the robot 300 flow by gravity.

In addition, the case 400 further includes a temperature regulating device 410 for heating or cooling an inside of the case 400. The temperature regulating device 410 heats or cools the inside of the case 400, so that the case 400 can maintain a constant temperature without being affected by the temperature of the outside of the case 400 (outside of the body part 200) to facilitate the robot 300 to be maintained in the standby state in an optimal condition, thereby maintaining operational effectiveness and preventing malfunction.

Here, the temperature regulating device 410 may include one or more among a heater 411, an air-conditioner 412, a blower fan 413, or a heating wire 414. That is, the temperature regulating device 410 may be made as one among the heater 411, the air-conditioner 412, the blower fan 413, or the heating wire 414, or include all of them, and the heater 411 and the air-conditioner 412 together may be configured as a single configuration. The blower fan 413 may increase or decrease the temperature inside the case 400 by discharging air inside the case 400 to the outside or by introducing air outside the case 400 to the inside. The heating wire 414 may be installed on an entire surface or part of an inner circumferential surface of the case 400, and may generate heat to heat the inside of the case 400.

In addition, the case 400 includes a second temperature sensor 420*a* formed on an outside of the case 400 and a third temperature sensor 420*b* formed on an inside of the case 400, and the central control unit 500 controls the temperature regulating device 410 using one or more values measured by the second temperature sensor 420*a* or the third temperature sensor 420*b*.

Using at least one among the measured values of the second temperature sensor 420*a* and the third temperature sensor 420*b*, the central control unit 500 may cool or heat the inside of the case 400 so that the internal temperature thereof can be adjusted to a constant temperature. In addition, the central control unit 500 uses measured values of both the second temperature sensor 420*a* and the third temperature sensor 420*b* to minimize the temperature difference between the inside and the outside of the case 400, thereby it is possible to prevent condensation from occurring inside the case 400 or the robot 300.

In addition, the case 400 includes a first humidity sensor 430*a* formed outside the case 400 and a second humidity sensor 430*b* formed inside the case 400, and the central control unit 500 controls the temperature regulating device 410 by using at least one among the measured values of the first humidity sensor 430*a* or the second humidity sensor 430*b*.

When the humidity inside or outside the case 400 is low and dry, there is a risk of fire in the electronic components constituting the robot 300, and when the humidity is high, corrosion of the components constituting the robot 300 and malfunction of the electronic components may occur, thus humidity control inside the case 400 is important for managing the robot 300.

Accordingly, by using at least one among the measured values of the first humidity sensor 430*a* and the second humidity sensor 430*b*, the central control unit 500 cools or heats the inside of the case 400 to adjust the humidity inside the case 400 to become constant, or by using measured values of both the first humidity sensor 430*a* and the second humidity sensor 430*b*, the central control unit 500 minimizes the difference in humidity between the inside and outside of the case 400, thereby preventing condensation from occurring inside the case 400 or the robot 300.

In addition, the case 400 may further include a brush part 440 formed inside the case 400 and cleaning a foreign substance on a surface of the robot 300. One side of the brush part 440 may be formed of a brush, and the other side thereof may be formed of a connection link that fixes the brush to the case 400 and moves the brush, and the brush unit 440 may brush off dust or foreign substances on the outer surface of the robot 300.

In addition, when a camera is formed in the robot 300, the brush may remove foreign substances attached to the camera lens.

In addition, the case 400 may further include an air gun 450 formed inside the case 400 and spraying air onto the surface of the robot 300. One or more air guns 450 may be formed on an inner upper surface, side, or lower surface of the case 400, and may spray compressed air onto the robot 300 to clean the surface of the robot 300.

Figure 7:
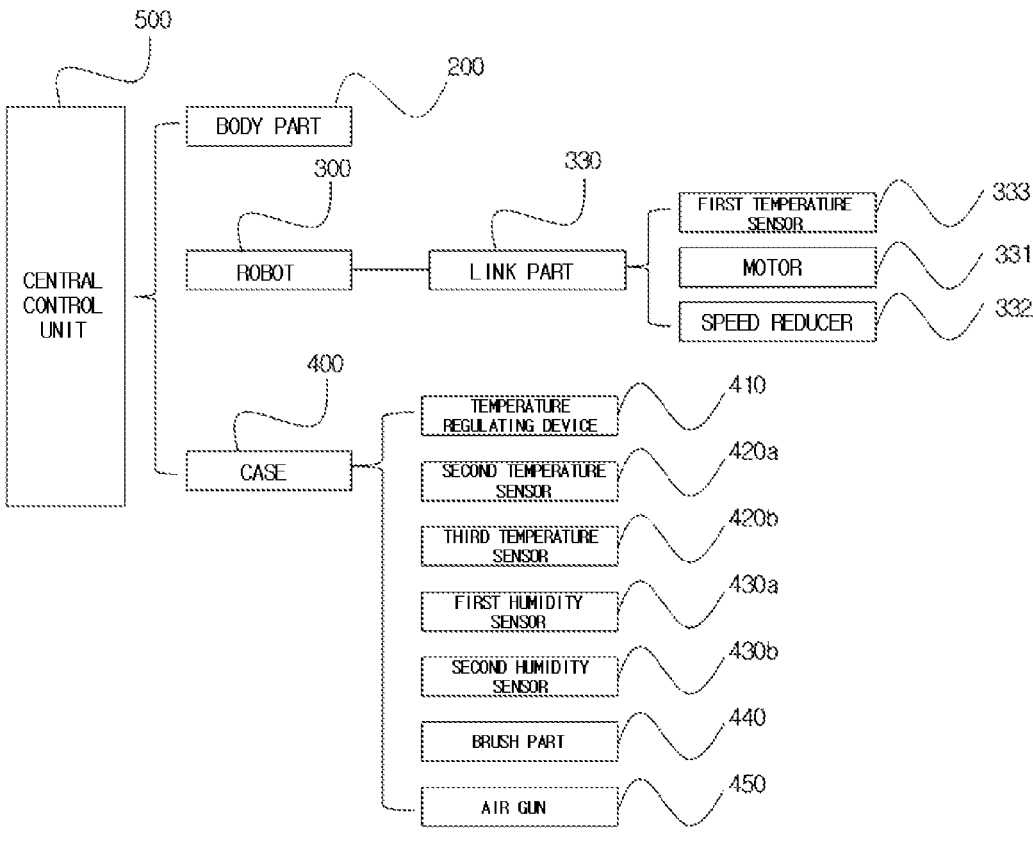
FIG. 7 is a control flow chart of the vehicle charging robot device according to the present disclosure.

Referring to FIG. 7, the central control unit 500 controls the body part 200, the robot 300 and the case 400, and the control of the robot 300 refers to controlling the link parts 330, 330*a* and 330*b* that constitute the first temperature sensor 333, the motor 331, and the speed reducer 332, and the control of the case 400 refers to controlling the temperature regulating device 410, the second temperature sensor 420*a*, the third temperature sensor 420*b*, the first humidity sensor 430*a*, the second humidity sensor 430*b*, the brush part 440 and the air gun 450.

In addition, the central control unit 500 is capable of exchanging signals with an external communication apparatus or a vehicle detection sensor formed outside.

In the operation of the robot 300 charging the vehicle 1000, the central control unit 500 receives an entry signal of the vehicle 1000 from the outside, location information of a charging inlet of the vehicle 1000 and the charging gun 2100, and generates a moving path of the robot 300, and the robot 300 approaches an area in which the vehicle 1000 is located. The robot 300 searches for a location of a charging inlet formed in the vehicle 1000 using a camera or a laser sensor mounted on the robot 300, and the robot 300 approaches to and removes a protective cap, holds the charging gun 2100 and connects it to the charging inlet. After that, when charging is completed, the robot 300 returns the charging gun 2100 to its original position, and returns the protective cap to its original position.

The robot 300 moves continuously, and at this time, the robot 300 is controlled to correct an error with the current posture while continuously receiving target position information from the recognition system, or the robot 300 is controlled to stop at a specific position to recheck the target position information, and after rechecking, it is controlled to correct the error with the current posture, and this process may be repeated.

A monitoring sensor capable of monitoring the force and torque generated in the process of inserting the charging gun 2100 into the charging inlet may be provided in the robot 300 so that the vehicle 1000 or the charging gun 2100 is not damaged in the process of inserting the charging gun 2100 into the charging inlet, and the central control unit 500 may control the robot 300 based on the force so that safe connecting can be made based on the sensing information of the monitoring sensor. In addition, the central control unit 500 may check whether the coupling between the charging inlet and the charging gun 2100 is successful, and whether the connecting failed due to a jamming problem occurred during the connecting process, and may perform the connecting again after analyzing a cause of the connecting failure when the connecting failed.

Figure 8:
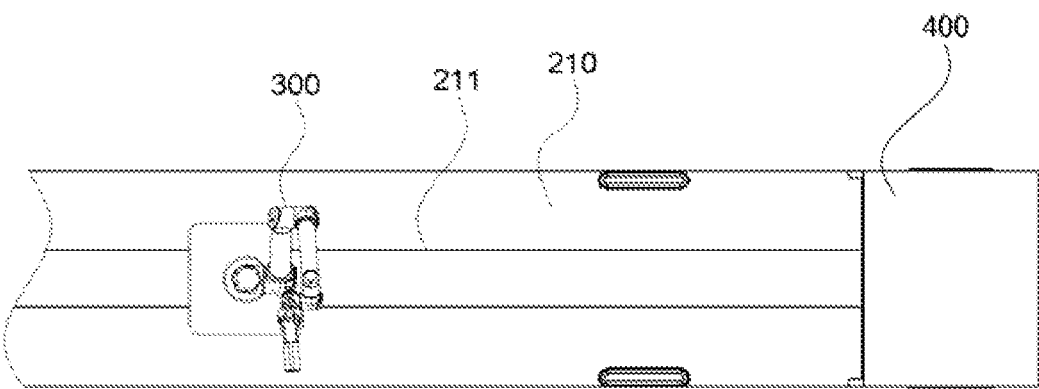
FIG. 8 is a bottom view of the ceiling portion of the vehicle charging robot device according to the present disclosure.

Referring to FIG. 8, the ceiling portion 210 is formed in a certain length or in a certain area along an extension direction of the ceiling portion 210, and further includes the rail 211 on which the robot 300 or the case 400 moves. That is, the robot 300 may move along the rail 211 in the ceiling portion 210 and connect the charging gun 2100 to the vehicle 1000. At this time, the rail 211 may include a linear motor, a ball screw, a lead screw, and a rack-and-pinion, and may be formed to have any configuration as long as it can move the robot 300, and the central control unit 500 may control the rail 211 or control the robot 300 connected to the rail 211 to move the robot 300. Even if a single robot 300 is formed, each of the charging gun 2100 formed in the plurality of chargers 2000 thereof can be used, therefore, a plurality of the vehicles 1000 can be charged by the rail 211.

Meanwhile, one or more rails 211 may be installed on the ceiling portion 210. In addition, the same number of the robots 300 as the number of the rails 211 may be installed. For example, two rails 211 may be formed on the ceiling portion 210, and the robot 300 may be installed on each of the two rails 211. In this case, when any one robot 300 moves along any one rail 211 and charges a vehicle, and the other vehicle enters, the other robot 300 moves along the other rail 211 and charges the other vehicle. Even in this case, it is preferable that the number of the rails 211 and the robots 300 is less than the total number of vehicles that can be charged. The reason is that the technical idea of the present disclosure is to minimize the number of the robots 300 installed by making a plurality of vehicles be charged by one robot 300.

Figure 9:
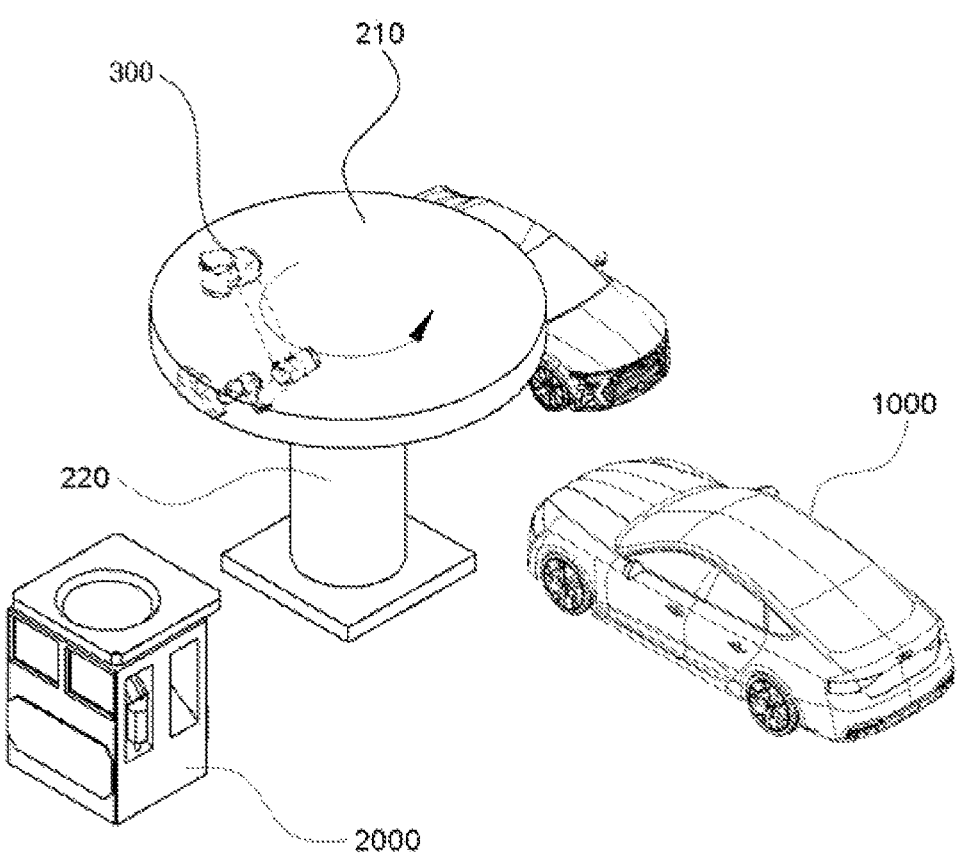
FIG. 9 is a perspective view of a second embodiment of the vehicle charging robot device according to the present disclosure.

Referring to FIG. 9, the ceiling portion 210 rotates with respect to the pillar portion 220, and one side of the robot 300 is connected to the ceiling portion 210 and a position of the robot 300 is changed according to rotation of the ceiling portion 210. That is, the ceiling portion 210 to which the robot 300 is connected rotates with respect to the pillar portion 220, and the robot 300 is positioned according to the rotation of the ceiling portion 210, and thus, each of the plurality of the charging guns 2100 formed in the charger 2000 may be used, resulting in a plurality of vehicles 1000 possible to be charged.

The robot 300 minimizes interference with the vehicle 1000 by moving along the rail 211 or by moving according to rotation of the ceiling portion 210, and compared to a case of the robot 300 moving with connection to the ground, the influence from snow, rain, foreign substances, and the like may be reduced.

The present invention is not limited to the above-described embodiments, and it is apparent that various modifications can be made without departing from the gist of the present invention as claimed in the claims.

The invention claimed is:

1. A robot device for charging a vehicle using a charger fixed on the ground and having a charging gun connected to a vehicle for charging fuel or electricity, comprising:
   a body part comprising a ceiling portion and a pillar portion, the pillar portion being fixedly formed on the same ground as the charger;
   a robot having one side connected to the ceiling portion and movable within a radius of the ceiling portion, and another side holding the charging gun;
   a case formed in the body part, having one surface thereof openable and closable, and storing the robot therein; and
   a central control unit capable of communicating with an outside, formed in the body part, and controlling the body part, the robot, and the case.

2. The robot device of claim 1, wherein the case stores the robot therein when there is no entry or exit of the vehicle or in a standby state where charging of the vehicle is unnecessary.

3. The robot device of claim 1, wherein the case is formed in a position close to the ground among the pillar portion.

4. The robot device of claim 1, wherein the case is formed in the ceiling portion, and the one surface thereof is openable and closable to discharge the robot downwardly from the ceiling portion.

5. The robot device of claim 1, wherein the case further comprises a temperature regulating device for heating or cooling an inside of the case.

6. The robot device of claim 5, wherein the temperature regulating device comprises one or more among a heater, an air-conditioner, a blower fan, or a heating wire.

7. The robot device of claim 5, wherein the case comprises:

a second temperature sensor formed on an outside of the case; and
a third temperature sensor formed inside the case, and
wherein the central control unit controls the temperature regulating device using one or more values measured by the second temperature sensor or the third temperature sensor.

8. The robot device of claim 5, wherein the case comprises:
a first humidity sensor formed on an outside of the case; and
a second humidity sensor formed on an inside of the case, wherein the central control unit controls the temperature regulating device using one or more values measured by the first humidity sensor or the second humidity sensor.

9. The robot device of claim 1, wherein the case further comprises a brush part formed inside the case and cleaning a foreign substance on a surface of the robot.

10. The robot device of claim 1, wherein the case further comprises an air gun formed inside the case and spraying air onto the surface of the robot.

11. The robot device of claim 1, wherein the ceiling portion is formed in a certain length or a certain area along an extension direction of the ceiling portion, and further comprises a rail on which the robot or the case moves.

12. The robot device of claim 11, wherein the rail comprises a linear motor, a ball screw, a lead screw and a rack-and-pinion.

13. The robot device of claim 11, wherein two or more rails are installed thereon, and the robot is installed on each of the rails.

14. The robot device of claim 13, wherein the number of rails is less than the total number of vehicles which are chargeable.

15. The robot device of claim 11, wherein the ceiling portion rotates with respect to the pillar portion, and one side of the robot is connected to the ceiling portion and a position of the robot is changed according to rotation of the ceiling portion.

16. The robot device of claim 1, comprising:
a body part connecting portion formed at one end and connected to the body part;
a grip part formed at another end to hold the charging gun;
a plurality of length parts connecting the body part connecting portion and the grip part; and
a link part formed between the plurality of length parts to connect the length parts to each other, and comprising a motor and a speed reducer.

17. The robot device of claim 16, further comprising:
a first temperature sensor formed in the link part,
wherein the central control unit heats the motor, when a temperature measured by the first temperature sensor is less than a predetermined reference temperature.

18. The robot device of claim 16, wherein the link part further comprises:
a discharge hole for discharging water droplets inside the link part to an outside due to condensation.

* * * * *